(12) United States Patent  
Fu et al.

(10) Patent No.: US 8,793,108 B2
(45) Date of Patent: Jul. 29, 2014

(54) THREE-DIMENSIONAL MODEL DETERMINATION FROM TWO-DIMENSIONAL SKETCH WITH TWO-DIMENSIONAL REFINEMENT

(75) Inventors: Yunhua Fu, Monmouth Junction, NJ (US); Richard Gary McDaniel, Hightstown, NJ (US)

(73) Assignee: Siemens Aktiengesellschaft, Munich (DE)

( * ) Notice: Subject to any disclaimer, the term of this patent is extended or adjusted under 35 U.S.C. 154(b) by 301 days.

(21) Appl. No.: 13/433,897

(22) Filed: Mar. 29, 2012

(65) Prior Publication Data

US 2013/0262041 A1 Oct. 3, 2013

(51) Int. Cl.
*G06F 17/50* (2006.01)
*G06F 19/00* (2011.01)

(52) U.S. Cl.
USPC .............. 703/2; 703/24; 382/133; 345/157; 348/46

(58) Field of Classification Search
CPC .................. G06F 17/5009; G06F 17/5068
USPC .............. 703/2, 4; 382/133; 345/157; 348/46
See application file for complete search history.

(56) References Cited

U.S. PATENT DOCUMENTS

| | | | |
|---|---|---|---|
| 8,294,082 B2* | 10/2012 | Melkis et al. ............... 250/227.2 |
| 2004/0076319 A1* | 4/2004 | Fauver et al. ................. 382/133 |
| 2006/0082571 A1 | 4/2006 | McDaniel |
| 2009/0122008 A1* | 5/2009 | Melkis et al. ................. 345/157 |
| 2011/0292363 A1* | 12/2011 | Ivey et al. ........................ 355/55 |
| 2012/0098937 A1* | 4/2012 | Sajadi et al. .................... 348/46 |

* cited by examiner

*Primary Examiner* — Thai Phan

(57) ABSTRACT

A three-dimensional model is determined from a two-dimensional sketch. Rather than or in addition to modification of 3D constraints to reduce gaps in the 3D model, 2D constraints are modified. The geometry of the 2D sketch is altered in the view plane (x, y) or 2D input instead of maintaining the geometry of the 2D sketch and only modifying in the view direction (z). Gaps may be reduced through alteration of the 2D geometry.

20 Claims, 5 Drawing Sheets

THREE-DIMENSIONAL MODEL DETERMINATION FROM TWO-DIMENSIONAL SKETCH WITH TWO-DIMENSIONAL REFINEMENT

BACKGROUND

The present embodiments relate to three-dimensional sketching. In particular, three-dimensional (3D) geometry is inferred from a hand-drawn, and thus, two-dimensional (2D), input.

U.S. Published Patent Application No. 2006/0082571, for Systems and Method for Three-Dimensional Sketching, provides three dimensional models using hand drawing recognition for fast prototype developing. The 3D geometry is inferred based on the 2D relationships of the lines and/or curves between newly drawn lines and any existing model. The relationships are converted to 3D constraints. The 3D constraints are then solved to find the potential 3D positions. The solution provides for various elements of the inferred geometry to form connected loops.

If the parts of the geometry are poorly sized or the relationships are wrong, solving the relationships for a looped geometry or solving a geometry which connects to an existing model at multiple points may cause gaps. The end points of each curve are modeled separately so that even where two curves are joined together at the same corner in the original 2D view, the two end points may separate along the z-axis in the 3D model when the 3D constraints are solved. The gaps are along a depth or viewing direction (e.g., in or out of the plane of the 2D input). FIG. 1 shows a case where a rectangular geometry of lines ABCD is hand drawn on a screen 12 representing an existing 3D model 14. The view of ABCD in FIG. 1 is a rotated view, not as drawn by the user as 2D sketch. The 2D sketch has the lines being connected. The different lengths for the A and C lines in the 3D model may cause the solution, where the other edges form perpendicular angles, to have a gap between the A and D curves.

The 3D constraints may be refined to close the gaps of the 3D geometry. The refinement may make the 3D geometry fit together cleanly. However, this refinement may cause alignments, angles, and other geometric properties to have poor results.

SUMMARY

In various embodiments, systems, methods and computer readable media with instructions are provided for three-dimensional model determination from a two-dimensional sketch. Rather than or in addition to modification of the 3D constraints to reduce gaps in the 3D model, 2D constraints are modified. The geometry of the 2D sketch is altered in the view or 2D input plane (x, y) instead of maintaining the geometry of the 2D sketch and only modifying results in the view direction (z). Gaps may be reduced through alteration of the 2D geometry.

In a first aspect, a non-transitory computer readable storage medium has stored therein data representing instructions executable by a programmed processor for three-dimensional model determination from a two-dimensional sketch. The storage medium includes instructions for receiving the two-dimensional sketch having objects in a view plane of the user, the view plane of the user comprising x and y dimensions, assigning two-dimensional constraints to the objects of the two-dimensional sketch, the two-dimensional constraints defined in the x and y dimensions, assigning three-dimensional constraints to the objects of the two-dimensional sketch, the three-dimensional constraints defined in the x and y dimension as well as a z dimension orthogonal to the view plane, solving for three-dimensional positions of the objects as a function of the two- and three-dimensional constraints, determining a gap along the z dimension based on the three-dimensional positions, altering relative positions of the objects of the two-dimensional sketch in the view plane of the user such that the x, y, or x and y coordinates of at least one of the objects is different, and solving for the three-dimensional positions of the objects as a function of the altered relative positions.

In a second aspect, a method is provided for three-dimensional model determination from a two-dimensional sketch. Lines, curves, or lines and curves are detected from a two-dimensional sketch. The lines, curves or lines and curves form a two-dimensional geometry. A processor applies an offset to the two-dimensional geometry in a plane of the two-dimensional geometry. Three-dimensional constraints for the two-dimensional geometry are solved with the applied offsets. The three-dimensional model is generated based on the solving.

In a third aspect, a non-transitory computer readable storage medium has stored therein data representing instructions executable by a programmed processor for three-dimensional model determination from a two-dimensional sketch. The storage medium includes instructions for determining a first offset of a point of a geometry of the two-dimensional sketch in two-dimensions, generating the three-dimensional model as a function of the first offset, projecting the three-dimensional model to the two-dimensions, and determining a second offset of the point as a function of the projection of the three-dimensional model in the two-dimensions.

Any one or more of the aspects described above may be used alone or in combination. These and other aspects, features and advantages will become apparent from the following detailed description of preferred embodiments, which is to be read in connection with the accompanying drawings. The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the embodiments. Moreover, in the figures, like reference numerals designate corresponding parts throughout the different views.

DETAILED DESCRIPTION OF EMBODIMENTS

Figure 1:
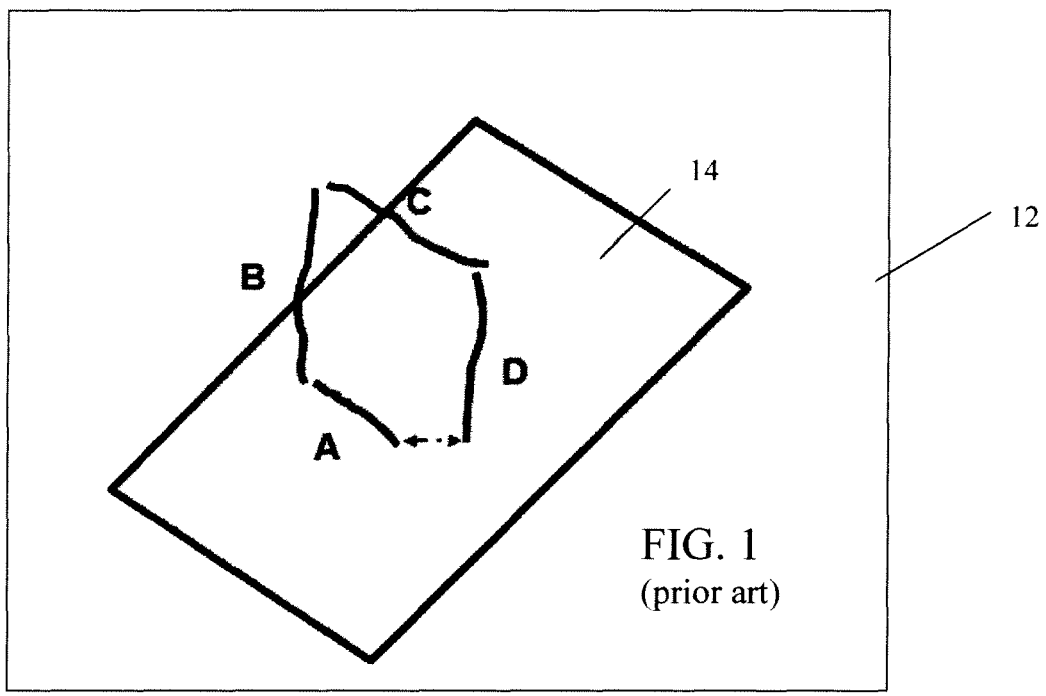
FIG. 1 illustrates prior art gap determination for 3D modeling from a 2D sketch.

To close the gaps in the 3D model, the original 2D drawing is modified. For one or more (e.g., each) point in the 2D drawing, an offset or "fudge factor" is added to the point's position. The offset is encapsulated into a 2D constraint defining the point location. The modification may provide for a more optimum 3D inference from the 2D geometry. The inferred 3D model may represent a part, scene, or other real or virtual world object.

U.S. Published Patent Application No. US2006/0082571 discloses modeling a 3D geometry from a 2D sketch. The inference uses 3D constraints. The geometry of the 2D sketch is maintained while gaps in the third dimension (depth or in/out of the input) are reduced through applied variance in the 3D constraints.

The present embodiments provide refinements to the stages described in U.S. Published Patent Application No. US2006/0082571, which is incorporated herein by reference. The stages are used to generate a 2D geometry from the 2D sketch, generate 3D constraints, solve the 3D constraints, and/or decompose a matrix to identify offsets in geometry or constraints for gap reduction. Instead of or in addition to reducing gaps through alteration of the 3D constraints, the modification uses a stage of 2D constraints where the positions of the user's drawing are transformed using offsets.

Rather than maintain the 2D geometry from the sketch, the 2D geometry is altered to reduce gaps in the 3D model. The values of the 2D constraints, after alteration, are used by the 3D constraints to determine 3D positions for the geometry. Essentially, the "fudge factors" or offsets are moved from the 3D constraints where the emphasis was to close gaps without changing the 2D locations of the user's drawing to 2D constraints where the drawing positions in the input plane are moved to try to perfect positions, lengths, and angles. The look and alignment of the user's drawing are modified.

In the system of U.S. Published Patent Application No. US2006/0082571, the look of the user's drawing may not be changed so that sketchy looking lines remain sketchy and in their original location when viewed from a given angle (user's input view or orthogonal to the plane of input). The modification may "beautify" the user's lines, straightening the curves and forcing alignments and symmetries. The position of the user's geometry is shifted so that if the 2D geometry were drawn that way in the first place, 3D alignments may be made with small or no gaps.

A separate data set holds 2D model points that are offset from the original 2D inferred geometry. The 2D model points are produced using 2D constraints to store and apply the offsets. The offsets to the 2D geometry may replace the gap offsets managed in the 3D constraints. To determine the offsets for the 2D geometry, the position of the 3D model is projected back into the view plane. The differences between the projection and the current or original 2D geometry of the same view plane provide offsets for the 2D constraints in one embodiment.

Figure 2:
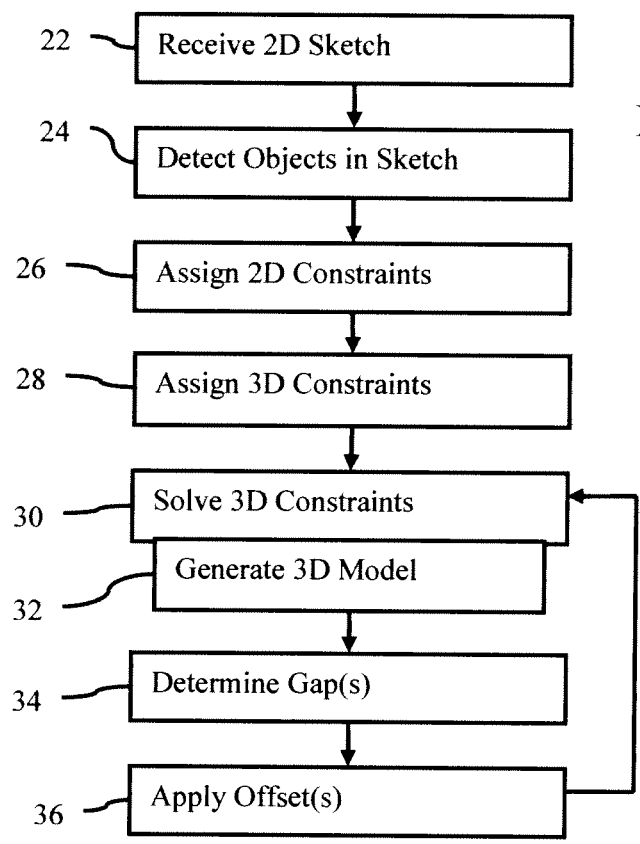
FIG. 2 is a flow chart diagram of one embodiment of a method for three-dimensional model determination from a two-dimensional sketch.

FIG. 2 shows a method for three-dimensional model determination from a two-dimensional sketch. The method is implemented by the system of FIG. 10, a system described in U.S. Published Patent Application No. US2006/0082571, and/or a different system. A processor performs the acts. The method represents modification of U.S. Published Patent Application No. US2006/0082571 and includes similar or the same acts. For example, acts 22, 24, 28, 30, 32, and/or 34 are performed as taught in U.S. Published Patent Application No. US2006/0082571. Other approaches may be used.

Additional, different, or fewer acts may be provided. For example, other stages disclosed in U.S. Published Patent Application No. US2006/0082571 may be used. As another example, acts 22 and 24 are not performed and the 2D geometry is provided from memory or another source without deriving from a sketch.

Figure 3:
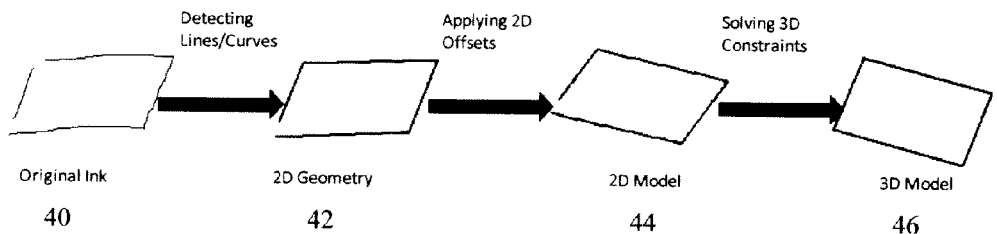
FIG. 3 is an illustration of geometric models using 2D constraint alteration, according to one embodiment.
Figure 4:
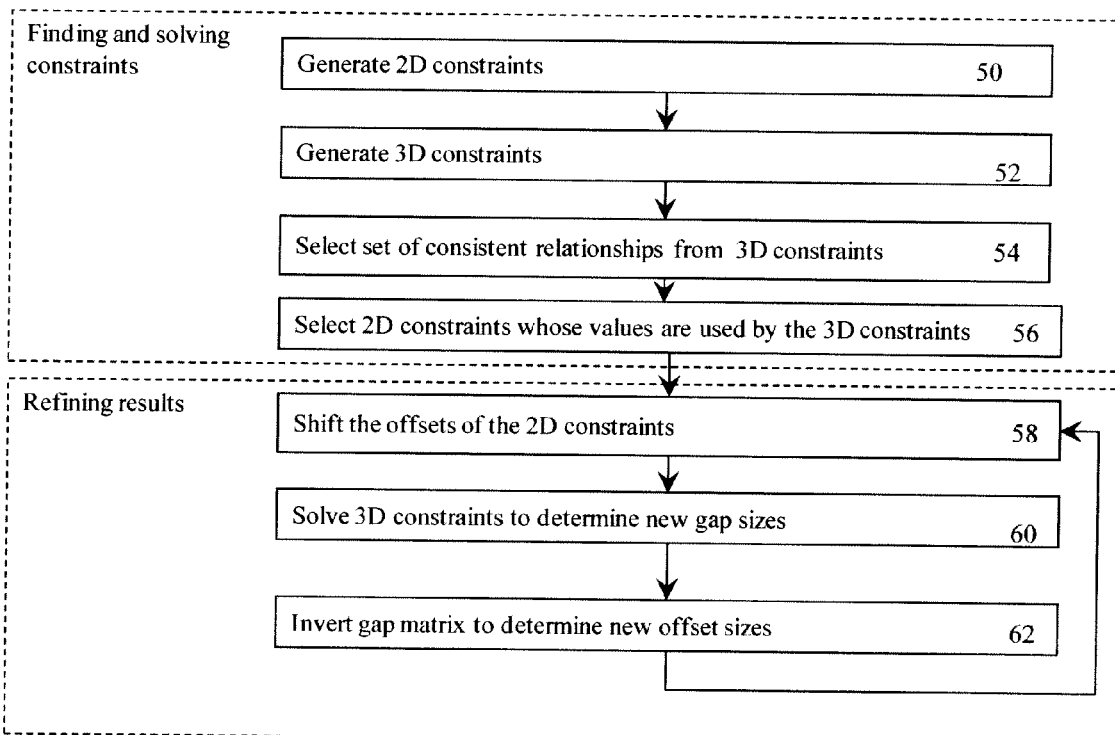
FIG. 4 is a flow chart diagram of another embodiment of a method for three-dimensional model determination from a two-dimensional sketch.

FIG. 3 shows geometries representing an alternative method for three-dimensional model determination from a two-dimensional sketch. FIG. 4 shows a flow chart of yet another alternative method for three-dimensional model determination from a two-dimensional sketch. The overlap and differences of FIGS. 2, 3, and 4 are discussed below.

The method of FIG. 2 is performed in the order shown or a different order. For example, acts 26 and 28 may be performed in reverse order. While the feedback is shown from act 36 to act 30, the feedback may be to act 26.

In act 22, a two-dimensional sketch having objects in a view plane of the user is received. The view plane of the user defines x and y dimensions. For example, a user draws lines or curves on a piece of paper or a screen of a computer. The input is on a two-dimensional surface. This two-dimensional surface is the view plane. In or out of the input or view plane is a third dimension (i.e., depth). The three dimensions are perpendicular to each other.

The view plane may be defined as a plane extending in x and y dimensions. The sketch is of lines with x and y coordinates. Since the input does not indicate a position along the z axis, the z coordinate is to be inferred.

The receipt of the sketch may be provided as disclosed in U.S. Published Patent Application No. US2006/0082571. The source may be a user input device, computer, memory, interface device for network transfer, a scan of a hand-drawing on paper, or other source. Receipt is by a processor, memory, database, server or other device performing the inference from the 2D sketch to a 3D model. The sketch may be of points representing a line or curve or a continuous line or curve.

The receipt is for identifying a framework of objects. The 2D sketch is formed from lines, curves, points, and/or other objects. The framework identifies the objects separately, such as based on continuity, angle, and/or location. FIG. 3 shows an example framework as the four lines in parallelogram geometry 40 of the hand drawing. Each line is a separate part of the framework.

In act 24, the objects in the sketch are detected. The objects may include points, lines, or curves. Other objects in the 2D sketch may be detected, such as geometric shapes. By separating the objects into points, lines, or curves rather than using geometric shapes, more freedom for 3D modeling may be provided. The geometric shape may be treated as an unconnected loop rather than requiring connection of all intersections. The detected lines and/or curves form a 2D geometry of separable objects or parts.

The detection is performed as discussed in U.S. Published Patent Application No. US2006/0082571, such as dividing into parts, creating the framework, and generation of spine lines. For example, parts are detected removing some points (e.g., redundant) of a series of points, grouping of line segments, combining of overlapping groups to form polygons, conversion of polygons for the line segments into spine line or lines based on adjacency and direction, finding intersections and corners, finding straight portions, and splitting into parts.

The detection may fit straight lines and/or curves within given parameters. Rather than rely on the line as drawn, lines within a given variance may be treated as straight. Curves restricted to given characteristics, such as number of directional changes and/or radius, may be used to distinguish curves from corners or intersections. A fit curve or intersection may replace the drawing for more geometric and less sketched appearance. In alternative embodiments, the sketched lines and/or curves are used without fitting a more precise object.

Referring to the example of FIG. 3, the original sketch 40 is converted to a 2D geometry by detection of lines and/or curves. In this example, four hand drawn lines are detected. None of the lines are detected as curves. Intersections are detected for four corners, such as based on proximity of end points. Since the geometry forms a loop, constraints formed at three of the corners may be able to be applied directly to create joined lines. The fourth corner constraint may not be applied and may produce a gap. For the 2D geometry, the sketched lines are replaced with fitted lines.

In act 26 of FIG. 2, two-dimensional constraints are assigned to the objects of the two-dimensional sketch. The two-dimensional constraints are assigned to the parts or objects of the framework, such as the separately determined lines, curves, or points.

The constraints are used for identification of what may be altered and for defining how to extrapolate to three dimensions. The values for the 2D geometry are derived from the two-dimensional sketch, in part, by assigning 2D constraints to the 2D geometry.

The 2D constraints are positional constraints. The limitations on alteration may be defined by the constraints. For example, a 2D vector constraint may prevent changing a direction of a line while allowing the line to extend the end points to other positions. As another example, a constraint may keep the end of a line attached to the projected position of a curve in an existing model. In one embodiment, the constraints for the 2D geometry are kept simple as free points defining the end of line segments with any mid-line free points for curves. In alternative embodiments, directional or other constraints may be used.

FIG. 4 shows generation of 2D constraints in act 50. The constraints define intersections, length, location, or other characteristics of the detected lines, curves, or objects. The 2D constraints may define the relationship between the detected objects. Joined parts determine where the gaps may exist in the 3D model. Where the joins form a loop, not all constraints are solved but the last join of the loop may remain open. The join or intersection to remain open may be changed. Any criteria for the initial or subsequent selection may be used, such as merely being the last intersection to process.

In one example embodiment, the 2D constraints use values directly derived from the geometry of the 2D hand drawing. The values indicate position of the parts of the 2D geometry. The position is in x and y dimensions where x and y define the view or input plane.

Figure 5:
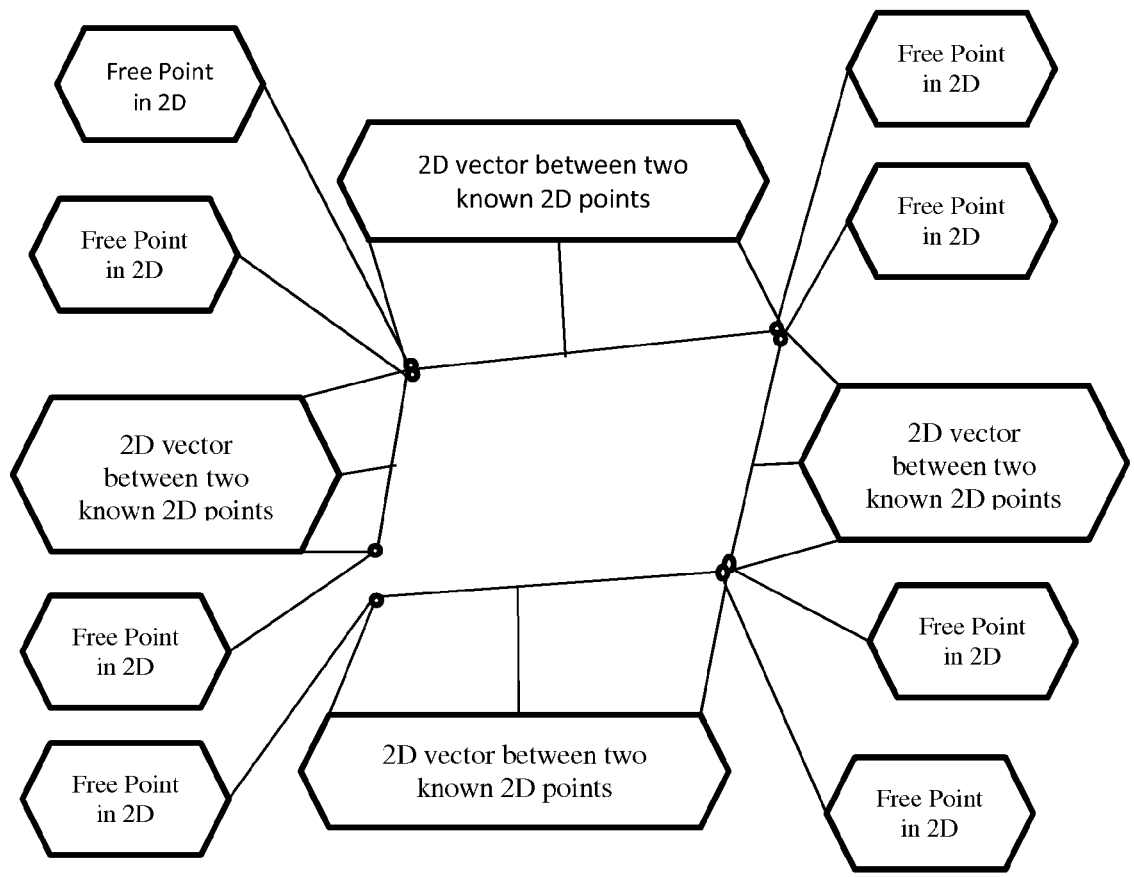
FIG. 5 illustrates example 2D constraints for a 2D sketch.

FIG. 5 shows example 2D constraints applied to the 2D geometry of the example in FIG. 3. Like 3D constraints, 2D constraints may have point and/or vector values. For example, a free point constraint allows a point to be placed freely anywhere in the 2D viewing plane with an offset. A line-to-point constraint represents a position on an existing line geometry such that the end or mid point may be placed but only along the line. A point-to-vector constraint is a vector constraint that converts the position of point constraints into a 2D vector. The example of FIG. 5 uses the free point constraints and point-to-vector constraints without limiting any of the lines as line-to-point constraints.

Other constraints may additionally or alternatively be used. The 2D constraints for a given 2D geometry may be selected from a list of possible constraints. Any criteria for selection may be used. For example, all end points that are not close to a projection line or curve of an existing model are initially assigned with free points. All lines are initially assigned with line-to-point and point-to-vector constraints. In the example of FIG. 3, there is one free point constraint for each end point of the four lines, and one point-to-vector for the lines or edges. Connections to existing model lines, curves, and points 2D constraints may be selected instead or in addition.

Directional 2D constraints may also be created. Constraints limiting the direction of the curves may be created. Parallel, perpendicular, angle, and orientation 2D constraints may be created to relate 2D vectors to other 2D vectors formed by the constraints. The directional constraints may be given offsets to help solve the geometry of the hand drawing. A single floating-point value parameter is added for each constraint that determines a linear direction (like the direction of a line).

In act 28, 3D constraints are assigned. To assign the 3D constraints, possible 3D constraints are generated (see act 52 of FIG. 4). The possible 3D constraints are from a list associated with the types of parts and relationships of these types of parts in the framework of the 2D geometry. The 3D constraints appropriate for the 2D geometry are selected. Any selection criteria may be used, such as disclosed in U.S. Published Patent Application No. US2006/0082571. For example, positional, directional, and/or other constraints are defined.

Referring to FIG. 2, the 3D constraints are solved in act 30. The 3D constraints rely on the 2D constraints for initial planar position and/or direction information. The 3D constraints define the relationships between the lines, points, and curves in three-dimensions. The functions or rules from the various 3D constraints are used to solve for a 3D geometry. The three-dimensional positions of the objects (e.g., parts of the framework) are solved using the 2D and 3D constraints.

Referring to FIG. 4, a set of consistent relationships is selected from a list of the possible 3D constraints in act 54. The 3D constraints' values are based on the 2D constraints, such as the position constraints. The selected 3D constraints are selected to be consistent with the 2D constraints. Of the consistent 3D constraints, the 3D constraints needed to solve for the position of each geometry entity uniquely are selected. Redundant constraints are ignored. For example, a constraint representing joining of two end points may not be used if those same end points also are joined to an end point of an existing model. The point-to-existing-model-point constraint for each end point would be sufficient to determine the position of the point.

In act 56, the 2D constraints whose values are used by the 3D constraints are selected. The 3D constraints, such as constraints defining two lines as parallel or perpendicular in 3D, reference to the results of the 2D constraints. For example, the points-to-vector constraints in the example of FIG. 5 define vectors that may be treated as parallel in 3D constraints. The 2D constraints that feed the 3D constraints are selected to include only those needed to solve the 3D constraints. Other 2D constraints are not selected.

The 3D constraints are defined in the x and y dimension as well as a z dimension. The z dimension is orthogonal to the view plane. The 3D constraints define and limit variance in the relationship between various parts in three-dimensions. The 3D constraints are used to extrapolate the 2D geometry into the 3D model (i.e., infer the 3D model from the 2D geometry).

By selecting consistent relationships of the objects in three-dimensions, a 3D model or geometry is solved. Other relationships that are discovered and the corresponding 3D constraints are not selected and used for solving. An iterative process may be used to deselect and select other 3D constraints for solving the 3D model.

The solution of the 3D model from the 3D constraints is performed as disclosed in U.S. Published Patent Application No. US2006/0082571. For example, solvers are selected and applied for directional 3D constraints, and the solvers are selected and applied for the positional 3D constraints. Further definition, selection, and application for solvers of other directional 3D constraints may be used or reapplied.

The solution of the 3D constraints generates the three-dimensional model in act 32. The final data is a 3D model where the lines and curves in the original 2D geometry are moved in the z-dimension to produce the 3D model.

The 3D model may have gaps. Due to the 3D constraint extrapolation of the 2D geometry to the 3D geometry, the objects that are meant to be joined may not align along the z dimension. FIG. 1 shows an example of a gap in the z-direction for lines A, B, C, D that intersect in the 2D geometry. A solution with minimal or no gaps is desired. To change the gaps, the 2D constraints may be changed. Change of 3D constraints or selection of different 2D or 3D constraints may additionally be used or are not used. U.S. Published Patent Application No. US2006/0082571 discloses variation in the 3D constraints to reduce gaps.

To refine the 3D model, gaps are determined in act 34. Any joins or endpoints that are not connected to other locations or objects of the 2D geometry in the 3D space have a gap. The gap is measured, such as a distance. The gaps are determined along the z-dimension based on three-dimensional position of the objects of the 2D geometry. Gaps in other dimensions may be identified and measured.

To reduce or close the gaps, offsets are applied in act 36. In an initial solution, the offsets are set to zero. After solving the 3D constraints with zero offsets in the 2D geometry and corresponding 2D constraints, one or more gaps may be identified. Offsets to the 2D geometry and corresponding 2D constraints are applied for a next iteration of the solution of the same or different 3D constraints.

The offsets are in the view or input plane. The original 2D geometry is shifted in the view plane. The 3D constraints are set to function on the offset positions of the 2D model instead of being tied to the original 2D positions of the geometry. The 2D geometry is altered rather than or in addition to relaxing or offsetting 3D constraints. The relative positions of the objects of the 2D sketch are altered in the view plane of the user. For example, end points of one or more lines are adjusted. The x, y, or x and y coordinates of the one or more objects is different due to the change. The position, amount of curvature, direction, or other alteration may be used. The alteration may be limited, such as end points being changed only along a given direction, or not. The amount of change (e.g., distance and/or angle) may be limited or not.

Changing the offsets cause the gaps that result from applying constraints to change. The 2D constraints may indicate the relative amount by which to change the offset for the next iteration cycle. In other embodiments, the offset is for one or both endpoints to provide an intersection at a desired angle. Random or other offsets, such as through iterative changes, may be applied.

The offsets are applied to the 2D constraints and the 3D constraints are solved again for each refinement pass, as represented by the feedback from act 36 to act 30. With each refinement pass, the offsets are changed to cause the gaps in the 3D geometry to close.

When the gaps become sufficiently small, the refinement is complete. Sufficient may be an amount associated with the pixel resolution. Once the gap is small enough that it would not be possible to see if the model were rotated, the gap is sufficiently small. Other settings or thresholds may be used, such as a user acceptable gap size or a size relative to an existing model.

In cases, where the refinement does not produce sufficiently small gaps, the method may select different constraints to solve. After attempting to close the gaps with current 2D and 3D constraints and failing, different 2D and/or 3D constraints may be selected. The criteria used to select constraints to remove may be based on the contribution of the constraint to evaluate the position of the largest gap. The constraint with the highest contribution may be removed from the set of constraints with other constraints selected to produce values for those geometric entities if available.

Referring to FIG. 4, acts 58, 60, and 62 represent one embodiment of the iteration to close gaps of acts 30, 32, 34 and 36 of FIG. 2. The offsets, if any, are used to shift the 2D constraints and corresponding 2D geometry in act 58. In an initial iteration, the offsets are zero. In act 60, the 3D constraints, based on the shifted 2D constraints, are solved and gap sizes are determined again.

The gap size results are collected in a matrix. The offset parameters are varied when solving the constraints to determine how the fudge factors or offsets affect the size of the gaps. The system builds a matrix to record how the gaps respond to different variances. The columns of the matrix represent the number of modifiable dimensions of the solvers associated with gaps. To compute the column, one parameter is set to a small value and the other parameters of the column are set to zero. Any solvers may be recomputed and the gaps re-measured to determine how the parameter relates to the gaps. The gap values are used as the values for the column. This iteration is repeated for each column. Other matrices may be provided, such as disclosed in U.S. Published Patent Application No. US2006/0082571.

In act 62, the gaps are closed using the matrix process by inverting the gap matrix. New offsets are determined based on the inversion. The relative positions of the 2D constraints are changed as a function of offsets from the inverting. LU or other decomposition inverts the matrix and determines how much to modify each parameter to reduce the size of the gaps the most. The process is then repeated in a Newton's method style until the gaps are sufficiently closed or progress stops so that the gaps are as small as possible given the current matrix. The constraints may have non-linear properties so the matrix may be recomputed several times to further minimize the gap sizes.

Figures 6, 7, 8, 9:
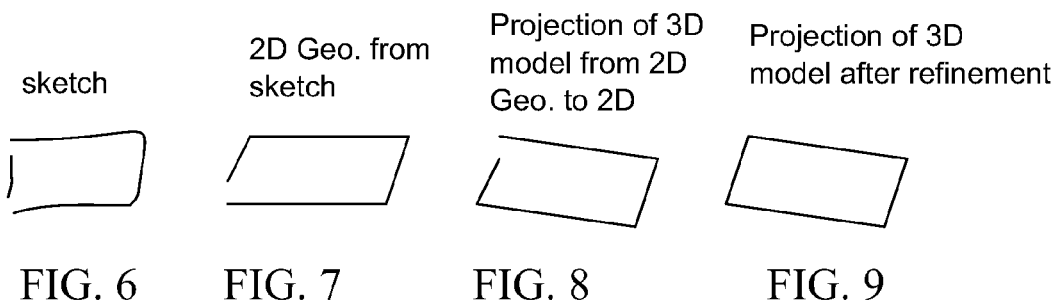
FIG. 6 illustrates an example hand drawn sketch.
FIG. 7 illustrates example 2D geometry derived from the hand drawn sketch of FIG. 6.
FIG. 8 illustrates a projection of a 3D model inferred from the 2D geometry of FIG. 7.
FIG. 9 illustrates a projection from a refined 3D model based on the alteration of 2D constraints to the 2D geometry of the projection of FIG. 8.

The number of refinement steps may be improved. To reduce the number of refinement steps or iterations, projection of the 3D model to the 2D view plane may be used to determine the offsets. The 2D constraint offsets are set to non-zero values based on the projection. FIGS. 6-9 represent this approach for closing or reducing the gaps. FIG. 6 shows a 2D sketch. FIG. 7 shows the 2D geometry determined from the 2D sketch of FIG. 6. After an initial solution of the 3D constraints but before the refinement process begins, FIG. 8 shows a projection of the 3D model back to the input or view plane. After the 3D model of the objects from the 2D geometry is solved, the 3D model is rendered back to two dimensions. By solving the 3D constraints, one or more objects are relatively realigned or moved in three dimensions. In determining 3D positions, a shift may occur. Given a same viewing direction as the 2D sketch, the 3D model is rendered to the view plane. The z-dimension is collapsed such that lines, curves, and/or points from the 3D model are projected to the 2D plane. The x, y, and z space is rendered to the x and y space.

The projection of FIG. 8 shows that the 3D model has a same position for two corners and different positions for two other corners as compared to the original 2D geometry of FIG. 7. FIG. 8 shows a projection of the results of a first calculation of the 3D constraints (with zero offsets for the 2D constraints). The 2D projection of the 3D model into the view plane does not match perfectly with the 2D geometry of FIG. 7 but instead many of the points are offset from the original. Other differences include the location of a gap and corresponding endpoint differences. The differences between the 2D constraints of the projection of the 3D model and the 2D geometry of the last iteration or the original 2D geometry are determined. For example, the difference between positions of endpoints for the four segments is determined.

The differences are used to update the offsets for the 2D constraints (i.e., the differences are used to apply offsets). The difference itself may be the offset. For example, the offsets of the 2D constraints are changed or assigned based on the projected 3D model rather than using refinement to search for offset values. The 2D constraint offsets are set, after this difference calculation, to the values found by taking the difference of this projected position and the original 2D geometry position. FIG. 3 shows the 2D geometry after applying offsets as the 2D model. In other embodiments, other functions are used to determine offsets from the differences. For example, the amount of offset may be limited. As another example, offsets determined from different considerations may be averaged or combined.

By projecting back to the 2D plane, the offsets are applied to the 2D constraints. The offsets are alterations in the x and/or y dimensions and not an alteration of the z-dimension or 3D constraints extrapolating to the z-dimension. The offset vector is only added to the 2D constraint solvers that generate positions. Position constraints are tied to geometry and are set with offsets derived from the point to which the position constraint references.

The 2D geometry of FIG. 8 represents the 2D geometry as shifted by the offsets derived from the projection of the 3D model. FIG. 9 shows the projection of the 3D model generated using the 2D constraints after refinement (i.e., further modifying the offsets of the 2D constraints represented by the 2D geometry of FIG. 8). More iterations may be used to provide the final results. While FIG. 9, due to being a projection into a plane, may not show gaps in the z-dimension, the adjustment of the 2D geometry also is intended to remove gaps from the z-dimension. For example, the gaps in the 3D model are reduced to zero.

Multiple offsets are applied for each iteration. Offsets for any differences are used. In other embodiments, the offset changes may be performed sequentially. For example, a single offset and corresponding 2D constraint are used each iteration. Once a local minimum is found, another 2D constraint and corresponding offset are altered to reduce gaps.

In the repetition of act 30, the 3D positions of the objects are solved using the altered relative positions of the 2D constraints. After applying the offsets, the 3D constraints, using the 2D constraints, are solved. The rules or functions for the 3D constraints are applied to the objects as positioned or at the positions represented by the 2D constraints. The offsets and resulting different 2D constraints provide a different 3D model. FIG. 3 shows a projection 46 of a 3D model associated with solving using the 2D constraints from the 2D model 44.

Figure 10:
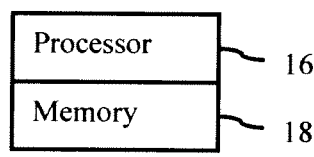
FIG. 10 is block diagram of one embodiment of a system for three-dimensional model determination from a two-dimensional sketch.

FIG. 10 shows a block diagram of a system for three-dimensional model determination from a two-dimensional sketch. The system includes a processor 16 and a memory 18. Additional, different, or fewer components may be provided. For example, an input device, such as a network card, wireless transceiver, and/or user input device are provided. As another example, a display, printer, network card, wireless transceiver and/or other output device is provided.

For entry of a 2D sketch, an input device may be a touch screen or drawing device. A scanner or other user interface for providing drawings may be used.

The computer processing performed by the processor 16 may be implemented in various forms of hardware, software, firmware, special purpose processors, or a combination thereof. Some embodiments are implemented in software as a program tangibly embodied on a non-transitory program storage device. By implementing with a system or code in a memory, 3D model generation from the 2D sketch is performed by the processor 16.

The processor 16 and/or memory 18 are part of a computer, personal computer, server, workstation, network processor, or other now known or later developed processing system. Various peripheral devices such as, for example, a display device, a disk storage device (e.g., a magnetic or optical disk storage device), a keyboard, a printing device, and a mouse, may be operatively coupled to the processor 16. A program may be uploaded to, and executed by, the processor 16. Likewise, processing strategies may include multiprocessing, multitasking, parallel processing and the like. The processor 16 is implemented on a computer platform having hardware such as one or more central processing units (CPU), graphic processing unit (GPU), a random access memory (RAM), and input/output (I/O) interface(s). The computer platform also includes an operating system and microinstruction code. The various processes and functions described herein may be either part of the microinstruction code or part of the program (or combination thereof) which is stored and executed via the operating system. Alternatively, the processor 16 is one or more processors in a network.

The instructions, user input (e.g., parameter or value assignment), rules, and/or other information are stored in a non-transitory computer readable memory, such as the memory 18. The memory 18 is an external storage device, internal storage device, RAM, ROM, and/or a local memory (e.g., solid state drive or hard drive). The same or different computer readable media may be used for the instructions and other data, such as the various parameters calculated for 3D model generation from the 2D sketch. The memory 18 may be implemented using a database management system (DBMS) managed by the processor 16 and residing on a memory, such as a hard disk, RAM, or removable media. Alternatively, the memory 18 is internal to the processor 16 (e.g. cache). The memory 18 stores data used by or resulting from the 3D model generation from the 2D sketch.

The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system. Because some of the constituent system components and method acts depicted in the accompanying figures are preferably implemented in code, the actual connections between the system components (or the process steps) may differ depending upon the manner in which the present embodiments are programmed.

The processor 16 is configured to receive the sketch, detect objects or a framework from the sketch, assign 2D and 3D constraints based on the objects, solve the 3D constraints using the 2D constraints for position of the 2D geometry, determine any gaps in the 3D model, determine and apply offsets to the 2D position constraints based on the gaps, and/or solve for the 3D model again, but with the updated 2D constraints. One or more iterations may be provided.

The processor 16 provides a sketching tool to infer a 3D geometry from a drawing. The sketching tool may be used to create the 3D model. The sketching tool may be used to edit or add to an already existing 3D model. The user draws in two-dimensions to indicate the addition or change relative to the 3D model. The processor 16 extrapolates the drawing relative to the 3D model.

The sketch may represent a real world construct or a design for a real world construct. An existing 3D model may represent a building, machine, or other device. The sketch may be for an alteration or addition to the building, machine, or other device. Other uses than design may be provided.

Various improvements described herein may be used together or separately. Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. In a non-transitory computer readable storage medium having stored therein data representing instructions executable by a programmed processor for three-dimensional model determination from a two-dimensional sketch, the storage medium comprising instructions for:
    receiving the two-dimensional sketch having objects in a view plane of the user, the view plane of the user comprising x and y dimensions;
    assigning two-dimensional constraints to the objects of the two-dimensional sketch, the two-dimensional constraints defined in the x and y dimensions;
    assigning three-dimensional constraints to the objects of the two-dimensional sketch, the three-dimensional constraints defined in the x and y dimension as well as a z dimension orthogonal to the view plane;
    solving for three-dimensional positions of the objects as a function of the two- and three-dimensional constraints;
    determining a gap along the z dimension based on the three-dimensional positions;
    altering relative positions of the objects of the two-dimensional sketch in the view plane of the user such that the x, y, or x and y coordinates of at least one of the objects is different; and
    solving for the three-dimensional positions of the objects as a function of the altered relative positions.

2. The non-transitory computer readable storage medium of claim 1 wherein receiving the two-dimensional sketch comprises identifying a framework of the objects, the objects comprising lines, curves, or lines and curves.

3. The non-transitory computer readable storage medium of claim 1 wherein assigning the two-dimensional constraints comprises assigning positional constraints defining limitations on the altering.

4. The non-transitory computer readable storage medium of claim 1 wherein assigning the two-dimensional constraints comprises deriving values from the two-dimensional sketch.

5. The non-transitory computer readable storage medium of claim 1 wherein assigning the three-dimensional constraints comprises selecting a set of consistent relationships from a list including the three-dimensional constraints, and wherein assigning the two-dimensional constraints comprises selecting the two-dimensional constraints as used by the three-dimensional constraints.

6. The non-transitory computer readable storage medium of claim 1 wherein solving comprises applying functions for the three-dimensional constraints to the objects as positioned by the two-dimensional constraints, an output of the applying comprising the three-dimensional model.

7. The non-transitory computer readable storage medium of claim 1 wherein determining the gap comprises calculating a distance between components of the three-dimensional model defined by solving.

8. The non-transitory computer readable storage medium of claim 1 wherein altering comprises inverting a gap matrix and changing the relative positions as a function of offsets from the inverting.

9. The non-transitory computer readable storage medium of claim 1 wherein altering comprises projecting a three-dimensional model determined by the solving to the view plane, determining differences between points in the projection and the objects, and altering by offsets in the x and y dimensions based on the differences.

10. A method for three-dimensional model determination from a two-dimensional sketch, the method comprising:
    detecting lines, curves, or lines and curves from the two-dimensional sketch, the lines, curves or lines and curves forming a two-dimensional geometry;
    applying, with a processor, an offset to the two-dimensional geometry in a plane of the two-dimensional geometry;
    solving three-dimensional constraints for the two-dimensional geometry with the applied offsets; and
    generating the three-dimensional model based on the solving.

11. The method of claim 10 wherein applying comprises altering a position of a point related to one of the lines or curves of the two-dimensional geometry.

12. The method of claim 10 wherein solving the three-dimensional constraints comprises solving with the two-dimensional geometry with the applied offsets different than the two-dimensional geometry as detected from the two-dimensional sketch.

13. The method of claim 10 further comprising iterating the applying, solving, and generating until all gaps in the three-dimensional model are below a threshold.

14. The method of claim 10 wherein solving comprises selecting the three-dimensional constraints and not selecting other three-dimensional constraints.

15. The method of claim 10 wherein applying comprises generating two-dimensional constraints.

16. The method of claim 10 wherein applying comprises calculating the offset from a gap in the three-dimensional model.

17. In a non-transitory computer readable storage medium having stored therein data representing instructions executable by a programmed processor for three-dimensional model determination from a two-dimensional sketch, the storage medium comprising instructions for:
   determining a first offset of a point of a geometry of the two-dimensional sketch in two-dimensions;
   generating the three-dimensional model as a function of the first offset;
   projecting the three-dimensional model to the two-dimensions; and
   determining a second offset of the point as a function of the projection of the three-dimensional model in the two-dimensions.

18. The non-transitory computer readable storage medium of claim 17 wherein determining the first offset comprises setting the first offset to zero in a first iteration.

19. The non-transitory computer readable storage medium of claim 17 wherein determining the second offset comprises calculating a difference in position between a result of the projecting and the point.

20. The non-transitory computer readable storage medium of claim 17 wherein determining the first and second offsets comprises generating two-dimensional constraints, wherein generating the three-dimensional model comprises solving for the three-dimensional model with three-dimensional constraints.

* * * * *